United States Patent [19]

Tabota et al.

[11] Patent Number: 5,763,982
[45] Date of Patent: Jun. 9, 1998

[54] MOUNTING ARRANGEMENT OF ACCELERATION DETECTING ELEMENTS

[75] Inventors: Jun Tabota; Toshihiko Unami, both of Toyama-ken; Jiro Inoue, Toyama, all of Japan

[73] Assignee: Murata Manufacturing Co., Ltd., Japan

[21] Appl. No.: 571,139

[22] Filed: Dec. 12, 1995

[30] Foreign Application Priority Data

| Dec. 12, 1994 | [JP] | Japan | 6-307442 |
| Jan. 23, 1995 | [JP] | Japan | 7-008392 |
| Jan. 23, 1995 | [JP] | Japan | 7-008393 |

[51] Int. Cl.$^6$ ............................................. H01L 41/08
[52] U.S. Cl. .................................... 310/329; 310/332
[58] Field of Search ............................. 310/329, 348, 310/319, 332

[56] References Cited

U.S. PATENT DOCUMENTS

| 3,739,202 | 6/1973 | Cady | 310/329 |
| 3,805,097 | 4/1974 | Yanchich et al. | 310/329 |
| 4,333,029 | 6/1982 | Kolm et al. | 310/329 |
| 4,791,617 | 12/1988 | Seymour | 310/329 X |
| 4,839,872 | 6/1989 | Gragnolati et al. | 310/329 X |
| 4,902,926 | 2/1990 | Engel et al. | 310/329 X |
| 5,452,612 | 9/1995 | Smith et al. | 310/329 X |
| 5,539,270 | 7/1996 | Kaji et al. | 310/329 |

Primary Examiner—Mark O. Budd
Attorney, Agent, or Firm—Ostrolenk, Faber, Gerb & Soffen, LLP

[57] ABSTRACT

To provide a mounting arrangement of acceleration detecting elements capable of detecting acceleration over a wide range with as few elements as possible and having substantially the same detection sensitivity with regard to acceleration operating in any direction of orthogonal coordinate axes, two acceleration detecting elements are disposed on an element attaching surface defining x-y plane in an x-y-z orthogonal coordinate system, such that orientations of the two acceleration detecting elements are along the x axis and y axis on the element attaching surface, a maximum sensitivity direction of one of the two acceleration detecting elements being inclined from the y axis toward the z axis by 40° to 50° and a maximum sensitivity direction of the other of the acceleration detecting elements being inclined from the x axis to the z axis by 40° to 50°.

7 Claims, 10 Drawing Sheets

MOUNTING ARRANGEMENT OF ACCELERATION DETECTING ELEMENTS

FIELD OF THE INVENTION

The present invention relates to a mounting arrangement of acceleration detecting elements used in detecting impact.

BACKGROUND OF THE INVENTION

A conventional example of an acceleration detecting element is constituted by a bimorph element of a double end fixing type. For example, a conventional example of an acceleration sensor 20a, shown in FIG. 11 in a simplified manner, includes a bimorph element 1 serving as an acceleration detecting element and a insulating case 2 containing the element positioned therein. The case is fixedly attached on a sensor attaching surface 3 such as a circuit board.

The bimorph element 1 is formed in a rectangular plate shape and is integrated by laminating two piezoelectric ceramics plates 6. Each plate 6 has a signal electrode 4 and an intermediate electrode 5 formed on its top and bottom faces, respectively. The piezoelectric ceramics plates 6 are bonded to each other via the intermediate electrode 5 and are polarized along their thickness direction, each plate being polarized in a direction opposite to that of the other piezoelectric ceramics plate 6. The broken line arrow marks in FIG. 11 designate the directions of polarization. The respective signal electrodes 4 in this example are formed along the longitudinal direction of the respective piezoelectric ceramics plates 6 and are extended to both opposite end portions of each plate.

Figure 11:
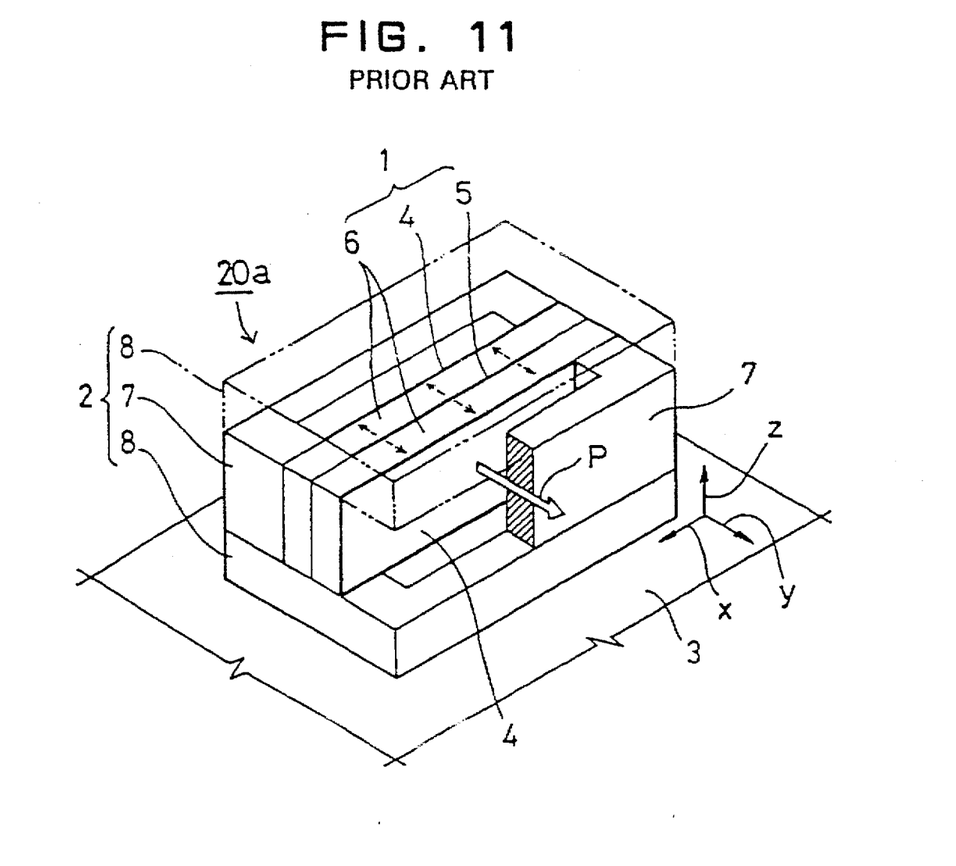
FIG. 11 is a partially broken-away perspective view showing the structure of an acceleration detecting element according to a conventional example.

The insulating case 2 is constituted by a pair of clamp frames 7 having a channel-like shape when seen in a plan view, clamping together both longitudinal end portions in the thickness direction of the bimorph element 1; and also by a pair of case lids 8 enclosing open faces formed by the bimorph element 1 and the clamp frames 7 arranged on opposite sides of the element. The respective signal electrodes 4 of the bimorph element 1 contained in the insulating case 2 are connected to external electrodes (not shown) formed at a pair of opposite outer end faces of the insulating case 2.

An outer surface of the clamp frames 7 or the case lids 8 constituting the insulating case 2 is positioned and fixed on the sensor attaching surface 3 thereby attaching the acceleration sensor. The respective signal electrodes 4 of the bimorph element 1 are connected to wiring patterns (not shown) on the sensor attaching surface 3 via the external electrodes formed on the insulating case 2. These wiring patterns are connected to a signal processing circuit (not shown). The signal processing circuit detects acceleration caused by impact by processing electric signals outputted from the acceleration sensor.

Figure 12:
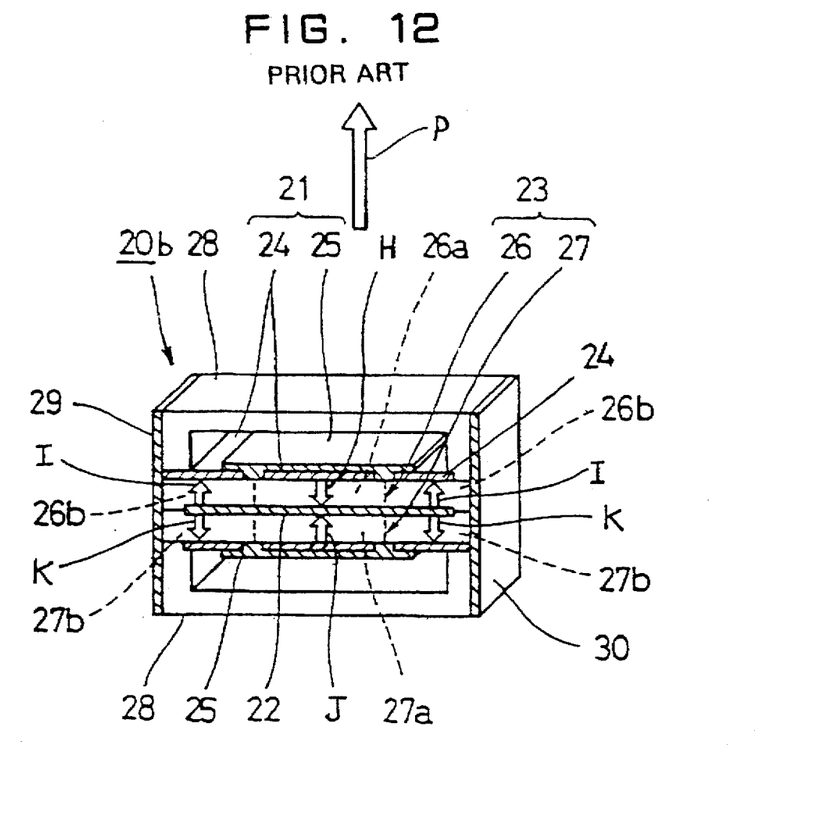
FIG. 12 is a partially broken-away perspective view showing the structure of a piezoelectric element according to another conventional example.

FIG. 12 shows another conventional example of such an acceleration detecting element which is different from the conventional example of FIG. 11 in respect of its polarization. FIG. 12 illustrates electrodes and the like in more detail than in the acceleration detecting element in FIG. 11.

The acceleration sensor 20b includes piezoelectric ceramics bodies 23 in a rectangular plate shape on the main surfaces of which signal output electrodes 21 are formed and wherein an inner electrode 22 in parallel with the signal output electrodes 21 is embedded. Each of the signal output electrodes 21 is constituted by three surface electrodes 24 arranged separately at a center location and end locations along the longitudinal direction of the piezoelectric ceramics bodies 23 and a connecting electrode 25 covering parts of all three surface electrodes 24.

An acceleration detecting element is constituted by the signal output electrodes 21 and the piezoelectric ceramics bodies 23.

One side electrode 24 of the signal output electrodes 21 (one of those on the top side in FIG. 12) is extended to one outer end surface (on the left side in FIG. 12) of the piezoelectric ceramics bodies 23. Also, one of the signal output electrodes 21 on the other side (the bottom side in FIG. 12) is extended to the other outer end surface (on the right side in FIG. 12). Further, ceramics regions 26 and 27 constituting the piezoelectric ceramics bodies 23, which oppose each other on opposite sides of the inner electrode 22, are respectively divided into three portions in the longitudinal direction, namely, center portions 26a and 27a and end portions 26b and 27b, the center portions being divided from the end portions via boundaries where the directions of stresses caused by the operation of acceleration are changed. The center portions 26a and 27a and the end portions 26b and 27b are polarized in the thickness direction with senses different from each other by a polarization process using the inner electrode 22 and the surface electrodes 24.

More specifically, the center portion 26a and the left and right end portions 26b constituting the ceramics region 26 are provided with senses of polarization which are different from each other, as indicated by the arrows H and I. Likewise, the center portion 27a and the left and right end portions 27b constituting the ceramics region 27 are provided with senses J and K of polarization which are different from each other, as indicated by the arrows J and K. Further, in this case, for example, the senses of polarization H and J of the center portions 26a and 27a are inward senses wherein the senses are directed toward each other, and the senses of polarization I and K of the end portions 26b and 27b are outward senses wherein the senses are directed apart from each other.

Both edges in the longitudinal direction of the acceleration sensor 20b are fixedly supported by a pair of clamp frames 28 having a channel-like shape when seen in a side view. The respective signal output electrodes 21 formed on main surfaces of the piezoelectric ceramics bodies 23 are connected to external output electrodes 29 and 30 formed on different outer end surfaces of the piezoelectric ceramics bodies 23 and the clamp frames 28.

The acceleration sensor 20b having such a structure operates as follows. When acceleration operates on the acceleration sensor 20b, which includes the acceleration detecting element constituted by the signal output electrodes 21 and the piezoelectric ceramics bodies 23, the center portions 26a and 27a and the end portions 26b and 27b in the ceramics regions 26 and 27 constituting the piezoelectric ceramics bodies 23 are deformed by the operation of inertial force. In this case the respective portions 26a, 27a, 26b and 27b receive tensile stresses or compressive stresses caused by the deformation. In the respective portions 26a, 27a, 26b and 27b an amount of charge generation is enhanced by a synergistic effect of the respective senses of polarization H through K and the received stresses, and an amount of charge generation of the overall acceleration sensor 20b is enhanced, which promotes the detection sensitivity of the acceleration sensor.

In the acceleration sensor 20a or 20b, a maximum electric signal is outputted when acceleration operates in a direction orthogonal to the surface of the piezoelectric ceramics plate 6 or 23, that is, in the thickness direction. Further, an electric signal having the same maximum absolute value with an inverse plus/minus sign is outputted when acceleration operates in a sense inverse thereto, that is, rotated by 180°. In these cases, the direction of the operation of acceleration is in the direction causing the maximum sensitivity, that is, the maximum sensitivity direction P, which is called a main axis of the acceleration sensor. No electric signal is outputted when acceleration operates in a direction tangential to the surface of the piezoelectric ceramics plates 6 or 23 in the acceleration sensor 20a or 20b and accordingly, the detection sensitivity is nullified. Meanwhile, when acceleration operates in a direction between the orthogonal direction and the tangential direction, a detection sensitivity has a value corresponding to an angle θ defined by the maximum sensitivity direction P and the operational direction of acceleration, that is, the detection sensitivity has a value of the maximum sensitivity S×cos θ.

When the acceleration sensor 20a having the above-mentioned conventional structure is attached on the sensor attaching surface 3 as shown in FIG. 11, the maximum sensitivity direction P is parallel with or orthogonal to the sensor attaching surface 3. As shown in FIG. 11 two-dimensional orthogonal coordinate axes (plane coordinate axes) x and y are defined on the sensor attaching surface 3. Three-dimensional orthogonal coordinate axes (space coordinate axes) x, y and z are defined with the sensor attaching surface 3 defined as the x-y plane, in a case where one of the case lids 8 of the insulating case 2, integrated with the bimorph element 1, is mounted on the sensor attaching surface 3. In a case where the longitudinally disposed maximum sensitivity direction P of the acceleration sensor 20a is oriented in the direction of the y axis on the sensor attaching surface 3, then acceleration along the x axis or the z axis, that is, acceleration operating in any direction in the x-z plane, cannot be detected.

Further, although not illustrated, if one of the clamp frames 7 of the insulating case 2 is attached on the sensor attaching surface 3 where the orthogonal coordinate axes x and y are defined, and the maximum sensitivity direction P of the acceleration sensor 20a is oriented in the direction of the z axis orthogonal to the sensor attaching surface 3, acceleration in any direction in the x-y plane constituted by the x axis and the y axis cannot be detected.

Therefore, in order to detect all accelerations operating in the respective directions of the mutually orthogonal coordinate axes x, y and z, three acceleration sensors, with their maximum sensitivity directions P aimed in the respective directions of the x axis, y axis and z axis, must be attached on the sensor attaching surface 3. This necessity increases the number of acceleration sensor elements and the installation space, giving rise to high cost and a complicated signal processing circuit for processing electric signals outputted from the three acceleration sensors.

Further, the same problem is naturally caused when the acceleration sensor 20b in FIG. 12 is attached on the sensor attaching surface 3 in place of the acceleration sensor 20a.

To avoid such inconvenience there has been proposed an acceleration detecting element capable of detecting acceleration operating in the three directions of the orthogonal coordinate axes x, y and z by previously inclining the maximum sensitivity direction of the acceleration detecting element upwardly from the sensor attaching surface. Although not illustrated, such an acceleration detecting element is disclosed in Japanese Unexamined Patent Publication No. 133974/1993 wherein the maximum sensitivity direction of an acceleration detecting element having a rectangular plate shape is inclined from a sensor attaching surface by 45° and an edge line of the acceleration detecting element is further inclined from an edge line of an element attaching substrate by 45°. When the acceleration detecting element having such a structure in the acceleration sensor is adopted, accelerations operating in the directions of the x axis, y axis and z axis (hereinafter, three directions in conformity with those shown in FIG. 11) can reliably be detected by a single element.

However, even if accelerations operating in the directions of the three orthogonal coordinate axes x, y and z may be detected, not all accelerations in all directions can be detected. It is impossible to detect acceleration operating in a plane orthogonal to the maximum sensitivity direction. Still further, although the maximum sensitivity direction is naturally inclined from the z axis by 45° in adopting the above structure, the directions of x axis and y axis in this case are inclined from the maximum sensitivity direction substantially by 60° and accordingly, the detection sensitivities in the direction of the x axis, y axis and z axis are not substantially the same.

SUMMARY OF THE INVENTION

The present invention has been created in view of the above-mentioned problems. It is an object of the present invention to provide a mounting arrangement of acceleration detecting elements capable of detecting acceleration over a wide angular range, with the number of elements being as few as possible, and having substantially the same detection sensitivities with respect to accelerations operating in the respective directions of the three orthogonal coordinate axes.

To achieve this object, one feature of the present invention is to provide a mounting arrangement of acceleration detecting elements comprising two acceleration detecting elements, wherein a first maximum sensitivity direction of one of the acceleration detecting elements is inclined from the y axis toward the z axis by 40° to 50° and a second maximum sensitivity direction of the other acceleration detecting element is inclined from the x axis toward the z axis by 40° to 50°. Further, the acceleration detecting element in this case is a bimorph element of a double end fixing type made of piezoelectric ceramics.

To further achieve the object, another feature of the present invention is to provide a mounting arrangement of acceleration detecting elements comprising two acceleration detecting elements and a calculating system for calculating a sum of absolute values of electric signals outputted from the respective acceleration detecting elements, wherein a first maximum sensitivity direction of one of the acceleration detecting elements is inclined from the y axis toward a z axis by 20° to 30° and a second maximum sensitivity direction of the other of the acceleration detecting elements is inclined from the x axis toward the z axis by 20° to 30°. Further, the acceleration detecting element in this case is a bimorph element of a double end fixing type made of piezoelectric ceramics.

Further, another feature of the present invention is to provide a mounting arrangement of acceleration detecting elements wherein inner electrodes are provided at an inner portion of the piezoelectric ceramics bodies having a rectangular plate shape. The inner electrodes are arranged separately at a center location and end locations of the piezoelectric ceramics bodies along a longitudinal direction. Signal output electrodes are provided on main surfaces of the piezoelectric ceramics bodies. Respective center portions and end portions along the longitudinal direction of the piezoelectric ceramics bodies, which are opposed to each other across the inner electrodes, are polarized in a thickness direction with different senses.

Other features and advantages of the present invention will become apparent from the following description of the invention which refers to the accompanying drawings.

DETAILED DESCRIPTION OF EMBODIMENTS OF THE INVENTION

Embodiment 1

An explanation will be given of Embodiment 1 of the present invention with reference to the drawings.

Figure 1:
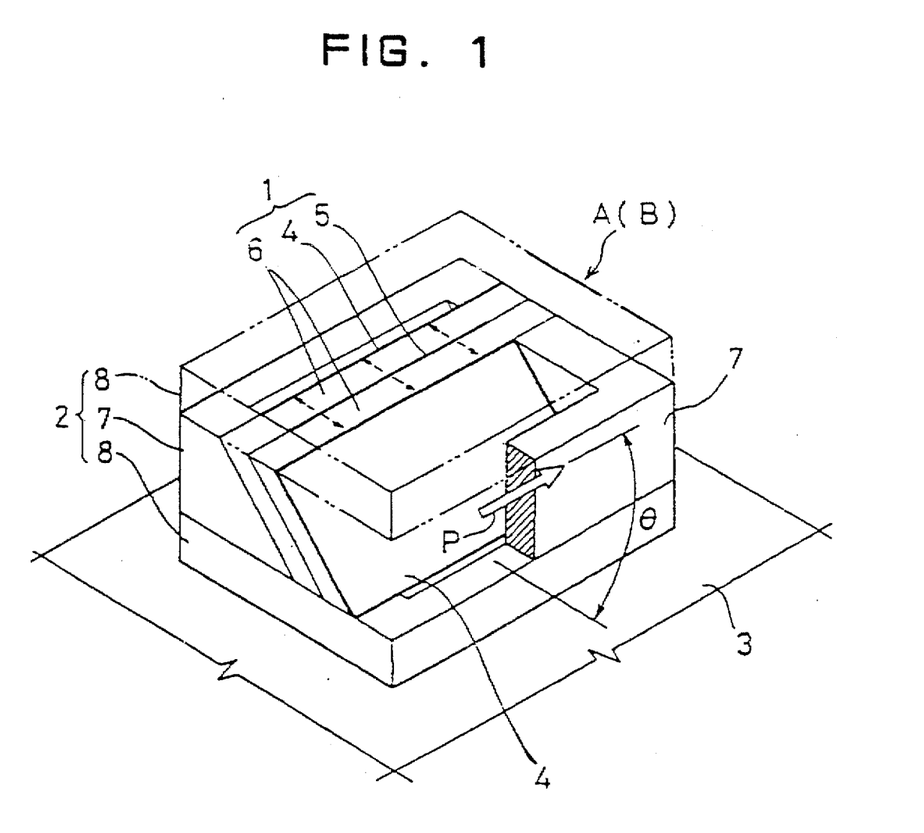
FIG. 1 is a partially broken-away perspective view showing a structure of an acceleration detecting element according to a first embodiment.
Figure 2:
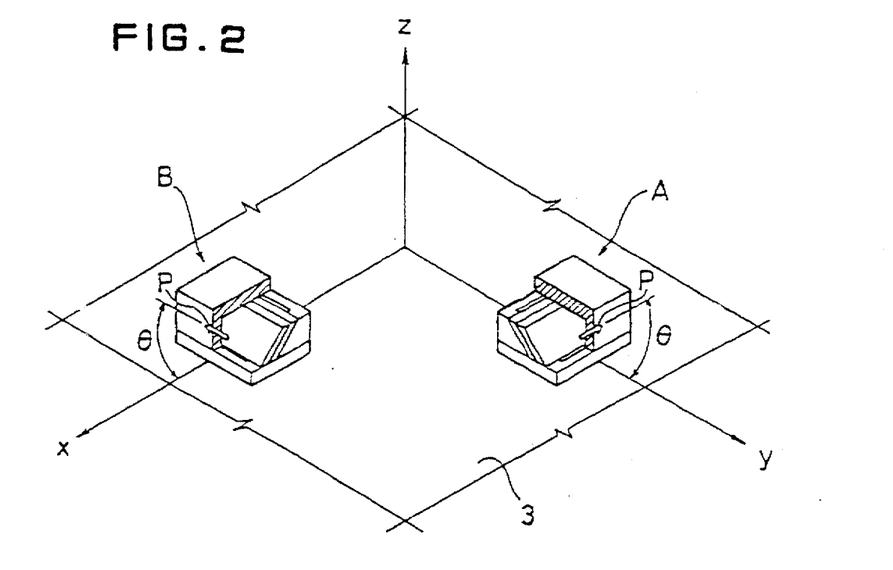
FIG. 2 is an explanatory view showing the mounting arrangement of the acceleration detecting element of the first embodiment.
Figure 3:
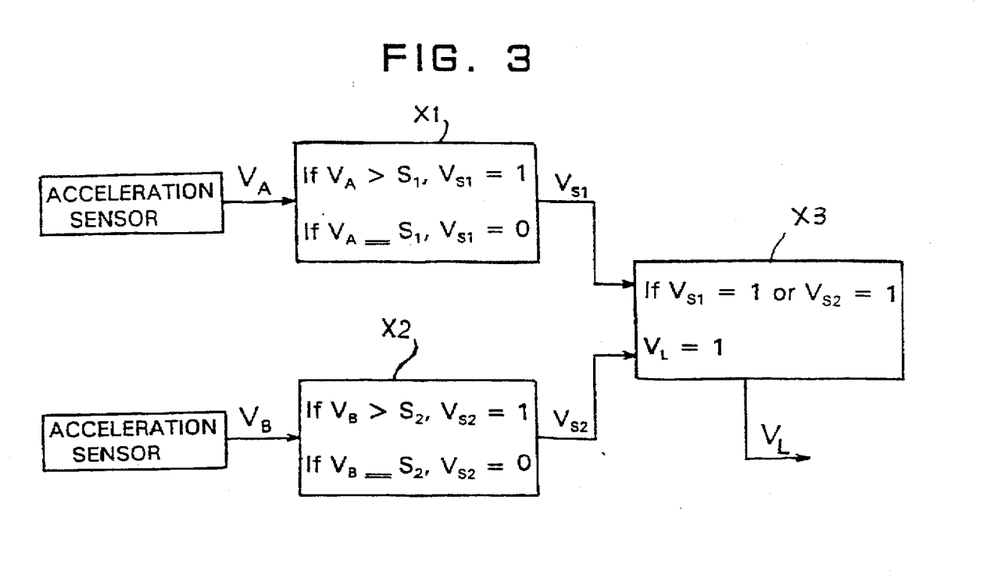
FIG. 3 is a functional block diagram showing the operation of the mounting arrangement of the first embodiment.

FIG. 1 is a partially broken-away perspective view showing an acceleration sensor, which part of a mounting arrangement of acceleration detecting elements according to a first embodiment, FIG. 2 is an explanatory view showing the general mounting arrangement of the acceleration detecting elements, and FIG. 3 is a functional block diagram showing the operation of the mounting arrangement of the first embodiment. The structure of the acceleration sensor including the acceleration detecting element is basically the same as that in the conventional example of FIG. 11. Therefore, in FIG. 1 and FIG. 2 portions or parts the same as those in FIG. 11 are given the same notations and a detailed explanation thereof will be omitted.

As shown in FIG. 1 the acceleration sensor A or B in the first embodiment comprises a double end fixing type bimorph element 1 which serves as an acceleration detecting element and an insulating case 2 containing the bimorph element 1. The acceleration sensors A and B are attached on an sensor attaching surface 3 such as a circuit board. The bimorph element 1 in this case is positioned and contained in the insulating case 2 in a state where the maximum sensitivity direction P is inclined from the sensor attaching surface 3. The maximum sensitivity direction P is oriented upwardly with an angle of inclination from the sensor attaching surface 3 being at least 40° and at most 50°, for example, 45°. Hereinafter, all references to 45° should be understood to include angles in the 40°–50° range as mentioned above.

The bimorph element 1 of the first embodiment comprises a pair of piezoelectric ceramics plates 6 both having a rectangular plate shape, and each having a signal electrode 4 and an intermediate electrode 5 formed on the top and the bottom surfaces thereof. The pair of plates are opposed and bonded together and end portions thereof are cut off by planes inclined from the thickness direction by 45° corresponding to the angle of inclination. The respective piezoelectric ceramics plates 6 bonded via the intermediate electrodes 5 are polarized in the thickness direction with senses inverse to each other and the respective signal electrodes 4 are extended up to mutually different end portions along the longitudinal direction of the respective piezoelectric ceramics plates 6, as in the conventional example. Further, the insulating case 2 in this case is constituted by using clamp frames 7 and case lids 8 as in the conventional example, and the respective signal electrodes 4 of the bimorph element 1 are connected to external electrodes (not shown) of the insulating case 2 which are formed on different respective outer end faces.

Meanwhile, as shown in FIG. 2, the mounting arrangement of acceleration detecting elements comprises the two acceleration sensors A and B attached on the same sensor attaching surface 3 in directions respectively along the orthogonal coordinate axes x and y. Further, as shown in FIG. 3, the attaching arrangement is connected to first and second comparator circuits X1 and X2 performing comparator processing of electric signals $V_A$ and $V_B$ respectively outputted from the electric elements A, B and a logical circuit X3 performing an OR logical processing of comparator signals $V_S1$ and $V_S2$ respectively outputted from the first and the second comparator circuits X1 and X2. The comparator circuits X1 and X2 and the logical circuit X3 are integrated in a signal processing circuit (not shown).

The acceleration sensors A and B are attached on the sensor attaching surface 3 by positioning and fixing an outer surface of the case lids 8 constituting the insulating case 2. The respective signal electrodes 4 of the bimorph element 1 are connected to wiring patterns (not shown) which have been formed on the sensor attaching surface 3 by soldering or another suitable method via external electrodes (not shown) on the insulating case 2. The maximum sensitivity direction P of the bimorph element 1, which serves as an acceleration detecting element and is integrated in the acceleration sensor A, is in a direction upwardly inclined from the y axis toward the z axis by 45°. The maximum sensitivity direction P of the bimorph element 1, which also serves as an acceleration detecting element and is integrated in the acceleration sensor B, is in a direction upwardly inclined from the x axis toward the z axis.

Now, an explanation will be given of the operation of the mounting arrangement of the acceleration detecting elements in this embodiment in reference to FIG. 2 and FIG. 3. In the following explanation the maximum sensitivity of the acceleration detecting elements (the acceleration sensors A and B) is S(mV/G) where G is the acceleration of gravity and thresholds for detecting impacts at certain levels or more are designated as $S_1$ and $S_2$.

Firstly, assume a case in which an acceleration of 1 G is applied from the positive direction of the orthogonal coordinate axis x to the mounting arrangement of the two acceleration sensors A and B arranged in the positional relationship shown in FIG. 2. In that case, the detection sensitivity of the acceleration sensor A arranged along the direction of the y axis is nullified whereas the detection sensitivity of the acceleration sensor B arranged along the direction of the x axis is indicated by the maximum sensitivity S multiplied by cos 45°. Therefore, an electric signal $V_A$ outputted from the acceleration sensor A in this case is 0 (mV) and an electric signal $V_B$ outputted from the acceleration sensor B is S×cos 45°×1 (mV). In the second comparator circuit X2 to which only the electric signal $V_B$ is inputted, a comparator processing is performed with the predetermined $S_2$ as a threshold. That is, when $V_B > S_2$, a comparator signal $V_{S2}=1$ and when $V_B \leq S_2$, the comparator signal $V_{S2}=0$. The comparator signal $V_{S2}$ is outputted from the second comparator circuit X2 to the logical circuit X3.

Further, when acceleration of 1 G is applied from the positive direction of the orthogonal coordinate axis y, the detection sensitivity of the acceleration sensor A arranged along the direction of the y axis is indicated by the maximum sensitivity S multiplied by cos 45° whereas the detection sensitivity of the acceleration sensor B arranged along a direction equal to the direction of the x axis is nullified. Accordingly, the electric signal $V_A$ outputted from the acceleration sensor A in this case is indicated by S×cos 45°×1 (mV) and the electric signal $V_B$ outputted from the acceleration sensor B is 0 (mV). In the first comparator circuit X1 to which only the electric signal $V_A$ is inputted from the acceleration sensor A, the comparator processing is performed with the predetermined $S_1$ as the threshold. That is, when $V_A > S_1$, the comparator signal $Vs_1=1$ and when $V_A \leq S_1$, the comparator signal $V_{S1}=0$. Thereafter, the comparator signal $V_{S1}$ is outputted from the first comparator circuit X1 to the logical circuit X3.

In a case when the acceleration of 1 G is applied from the positive direction of the orthogonal coordinate axis z, both of the detection sensitivities of the acceleration sensors A and B are indicated by the maximum sensitivity S multiplied by cos 45° and the electric signals $V_A$ and $V_B$ outputted from the acceleration sensors A and B are indicated as S×cos 45°×1 (mV). Further, in the first comparator circuit X1 to which only the electric signal $V_A$ is inputted from the acceleration sensor A, the comparator processing is performed with $S_1$ as the threshold and in the second comparator circuit X2 to which only the electric signal $V_B$ is inputted from the acceleration sensor B, the comparator processing is performed with S2 as the threshold. Thereafter, the comparator signals $V_{S1}$ and $V_{S2}$ are outputted from the first and the second comparator circuits X1 and X2 to the logical circuit X3.

In the logical circuit X3 to which either one or both of the comparator signals $V_{S1}$ and $V_{S2}$ are inputted from the comparator circuits X1 and X2, an OR logical processing is performed on the comparator signals $V_{S1}$ and $V_{S2}$, that is, a logical circuit signal $V_L=1$ if $V_{S1}=1$ or $V_{S2}=1$. Thereafter, the logical circuit signal $V_L$ is outputted from the signal processing circuit.

As explained above, when the mounting arrangement of acceleration detecting elements in this embodiment is adopted, substantially the same detection sensitivities are provided with respect to any one of the directions of the orthogonal coordinate axes x, y and z, that is, detection sensitivities are equal to the maximum sensitivity S multiplied by cos 45°. Further, in the mounting arrangement of this embodiment, the only direction in which a detection sensitivity is nullified is that direction orthogonal to the maximum sensitivity directions P of both the acceleration sensors A and B, thereby providing an advantage in that acceleration can be detected over a wide angular range.

Incidentally, in the mounting arrangement of this embodiment, the maximum sensitivity directions P of the bimorph elements 1 respectively integrated in the acceleration sensors A and B are inclined from the sensor attaching surface 3 by the angle of inclination of 45°. However, it has been recognized by the inventors of the present invention that the angle of inclination is not restricted to 45° but may be in a range of 40° or more and 50° or less in practice. A ratio of cos 40° to cos 45°, considering the case where the angle of inclination is 40°, is (cos 40°)/(cos 45°)=1.083 ... A ratio of cos 50° to cos 45°, considering the case where the angle of inclination θ is 50°, is (cos 50°)/(cos 45°)=0.909 ... Therefore, the ratios are within a range of substantially ±10% of the value in the case of the angle of inclination of 45°.

Therefore, it is apparent that detection sensitivities substantially the same as those in this embodiment can be provided in any of the directions of the orthogonal coordinate axes x, y and z.

Embodiment 2

Figure 4:
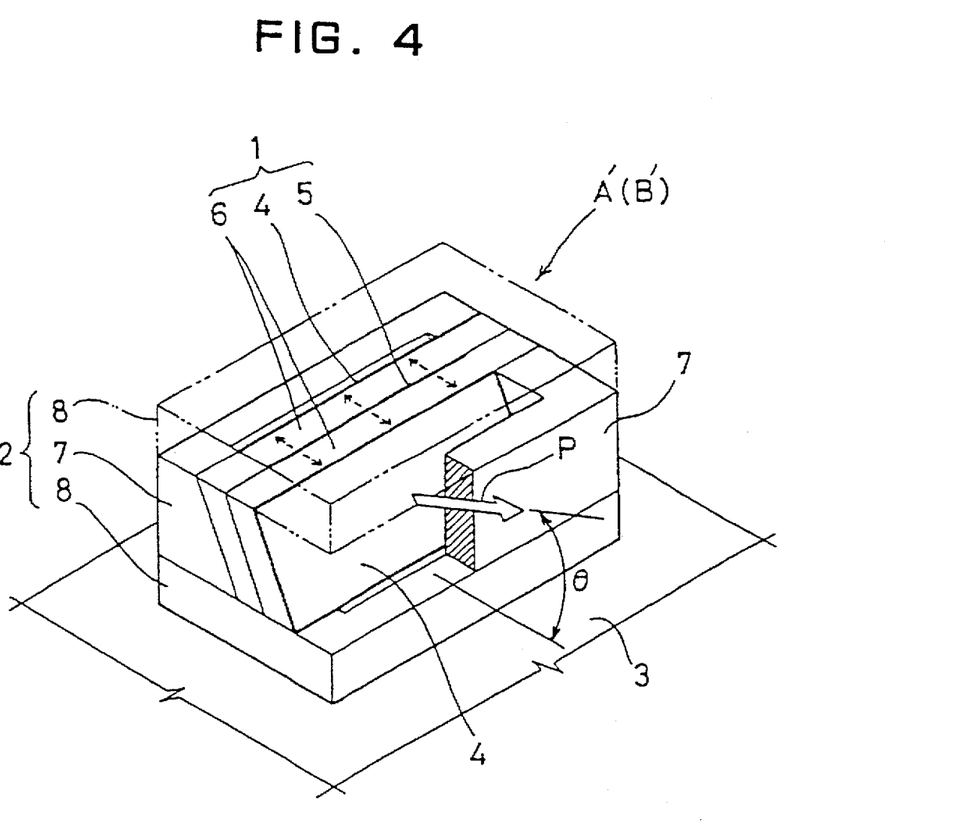
FIG. 4 is a partially broken-away perspective view showing the structure of an acceleration detecting element according to a second embodiment.
Figure 5:
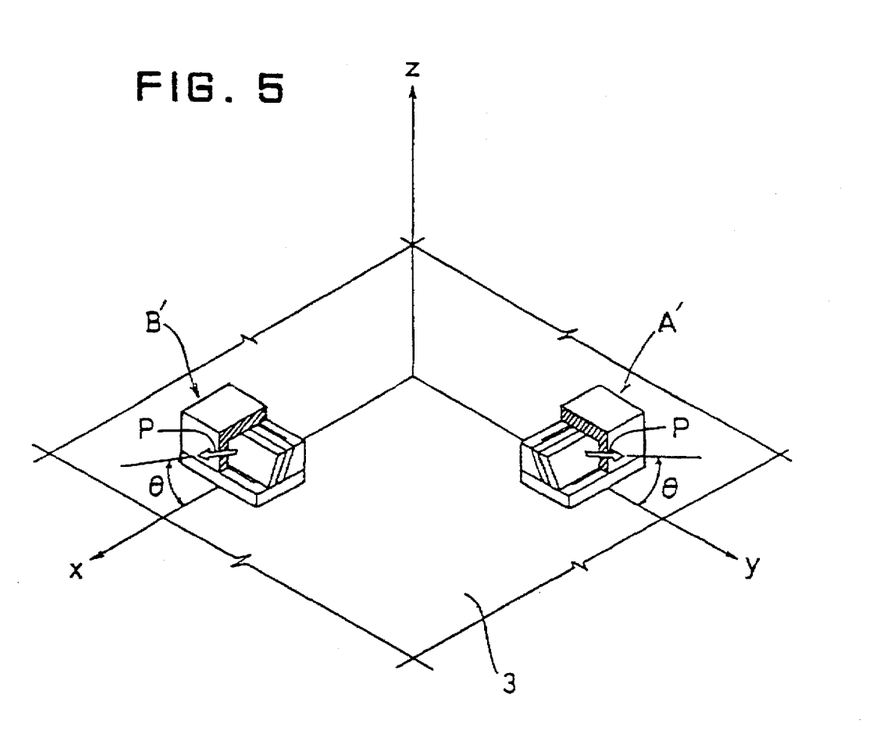
FIG. 5 is an explanatory view showing the attaching arrangement of the acceleration detecting element of the second embodiment.
Figure 6:
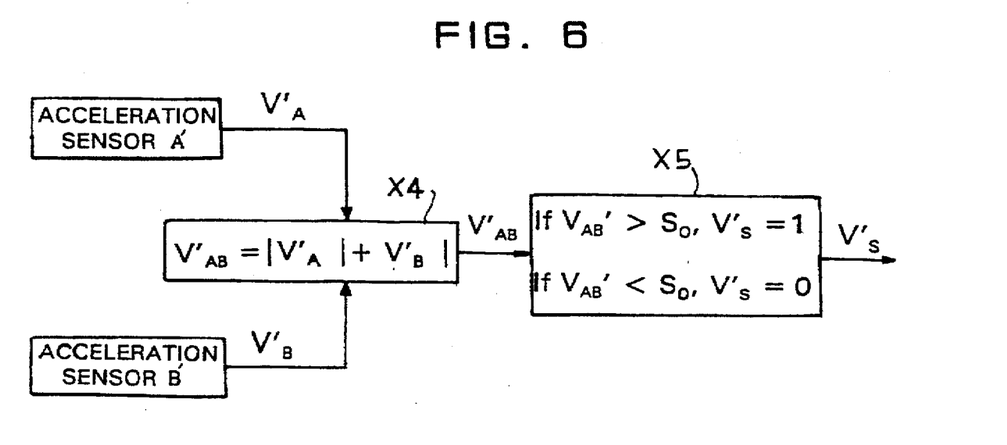
FIG. 6 is a functional block diagram showing the operation of the mounting arrangement of the second embodiment.

FIG. 4 is a partially broken-away perspective view showing an acceleration sensor, which is part of a mounting arrangement of an acceleration detecting element in a second embodiment, FIG. 5 is an explanatory view showing the general mounting arrangement of the acceleration detecting elements and FIG. 6 is a functional block diagram showing the operation of the mounting arrangement of the second embodiment. Further, the structure of the acceleration sensor including the acceleration detecting element per se is basically the same as in the conventional example and the first embodiment and accordingly, in FIG. 4 and FIG. 5 portions or parts that are the same as those in FIG. 11 and FIG. 1 are referred to with the same notations and a detailed explanation thereof will be omitted.

As shown in FIG. 4 each of the acceleration sensors corresponding to the second embodiment respectively comprise a double end fixing type bimorph element 1 and an insulating case 2 containing the element. These acceleration sensors are attached on the sensor attaching surface 3 such as a circuit board. The bimorph element 1 in this case is positioned and contained in the insulating case 2 in a state inclined with respect to the sensor attaching surface 3 and the maximum sensitivity direction P is directed upwardly at an angle of inclination θ from the sensor attaching surface 3 in the range of 20° or more to 30° or less, for example, 25°. Thus, references hereinafter to 25° will be understood to include the range of 20°–30°.

In the bimorph element 1, which serves as the acceleration detecting element of the second embodiment, a pair of piezoelectric ceramics plates 6 both have a rectangular plate shape and have a signal electrode 4 and an intermediate electrode 5 formed on the top and the bottom faces thereof. They are opposed to each other and bonded on opposite sides of the intermediate electrode 5, and edge portions thereof are cut off by planes inclined from the thickness direction by 25° corresponding to the angle of inclination θ. Further, the respective piezoelectric ceramics plates 6 are polarized in the thickness direction with senses inverse to each other and the respective signal electrodes 4 are extended up to different respective end portions along a longitudinal direction of the respective piezoelectric ceramics plates 6, as in the conventional example. Further, the insulating case 2 in this case is constituted by clamp frames 7 and case lids 8 as in the conventional example and the respective signal electrodes 4 of the bimorph element 1 are connected to external electrodes (not shown) formed on different outer end faces of the insulating case 2.

As shown in FIG. 5 and FIG. 6, in the mounting arrangement of the acceleration detecting elements in the second embodiment, two acceleration sensors A' and B' are attached to the same sensor attaching surface 3 in the directions of the orthogonal coordinate axes x and y. A calculating circuit X4 is provided for calculating a sum ($|V'_A|+|V'_B|$) of absolute values of electric signals $V'_A$ and $V'_B$ outputted respectively from the acceleration sensors A' and B' and a comparator circuit X5. The structure of a calculating circuit X4 for performing the above-mentioned calculation is well known and a detailed explanation thereof will be omitted.

The outer surfaces of the case lids 8 constituting the insulating cases 2 are positioned and fixed, thereby attaching the respective acceleration sensors A' and B' to the sensor attaching surface 3. The respective signal electrodes 4 of the bimorph element 1 are connected to respective wiring patterns (not shown) formed on the sensor attaching surface 3 by soldering or another suitable method via external electrodes (not shown) formed on the insulating case 2. The maximum sensitivity direction P of the bimorph element 1 integrated in the acceleration sensor A' in this case is inclined upwardly from the y axis toward the z axis by 25° and the maximum sensitivity direction P of the bimorph element 1 in the acceleration sensor B' is inclined upwardly from the x axis to the z axis by 25°.

Next, an explanation will be given of the operation of the mounting arrangement of the acceleration detecting elements in the second embodiment with reference to FIG. 5 and FIG. 6. In the following explanation the maximum sensitivities of the acceleration detecting elements (the acceleration sensors A' and B') are S'(mV/G) where G is the gravitational acceleration.

Now, assume a case in which an acceleration of 1 G is applied from the positive direction of the orthogonal coordinate axis x to the mounting arrangement constituted by the two acceleration sensors A' and B' arranged in the positional relationship shown in FIG. 5. In that case, the detection sensitivity of the acceleration sensor A' attached along the y axis is the maximum sensitivity S' multiplied by cos 90° and the detection sensitivity of the acceleration sensor B' attached along the direction of the x axis is the maximum sensitivity S' multiplied by cos 25°. The electric signal $V_A'$ outputted from the acceleration sensor A' is S'×cos 90°×1 (mV) and the electric signal $V_B'$ outputted from the acceleration sensor B' is S'×cos 25°×1 (mV). In a calculating circuit X4 a sum ($|V_A'|+|V_B'|$) of absolute values of the electric signals $V_A'$ and $V_B'$ outputted respectively from the acceleration sensors A' and B', that is, $|S'|\times\cos 90°|+|S'\times\cos 25°|=S'\times 0.91$ (mV) is calculated as a synthesized signal $V'_{AB}$. The synthesized signal $V'_{AB}$ which has been calculated in accordance with such a procedure, is outputted to the comparator circuit X5. In the comparator circuit X5 a comparator processing is performed with a predetermined $S_0$ as a threshold. In the comparator circuit X5, when $V'_{AB} > S_0$, the comparator signal $V_S' = 1$ and when $V'_{AB} < S_0$ the comparator signal $V'_S = 0$. Thereafter, the comparator signal $V'_S$ is outputted from the calculating circuit.

Although the above explanation has been given of a case in which an acceleration of 1 G is applied from the positive direction of the orthogonal coordinate axis x, the same is applicable to a case where an acceleration of 1 G is applied from the positive direction of the orthogonal coordinate axis y and S'×0.91 (mV) is calculated as the synthesized signal $V'_{AB}$.

Further, in a case where an acceleration of 1 G is applied from the positive direction of the orthogonal coordinate axis z to the mounting arrangement of FIG. 5, the following operation is performed. The detection sensitivities of both the acceleration sensors A' and B' in the direction of the z axis, is the maximum sensitivity S' multiplied by cos 65°, that is, multiplied by cos(90°−25°), since the angles of inclination of the acceleration sensors A' and B' from the sensor attaching surface 3 are 25°. Therefore, both of the electric signals $V'_A$ and $V'_B$ outputted respectively from the acceleration sensors A' and B' in this case are indicated by S'×cos 65°×1 (mV). The calculating circuit X4 calculates a sum of absolute values of the electric signals $V'_A$ and $V'_B$ outputted respectively from the acceleration sensors A' and B', that is, $|S'\times\cos 65°|+|S'\times\cos 65°|=S'\times 0.85$ (mV) as the synthesized signal $V'_{AB}$.

In the mounting arrangement of the acceleration detecting elements in the second embodiment, substantially the same detection sensitivities are provided in any direction of the orthogonal coordinate axes x, y and z. Further, in the mounting arrangement of the second embodiment, a direction in which the detection sensitivity is nullified is a direction orthogonal respectively to the maximum sensitivity directions P of the acceleration sensors A' and B' thereby providing an advantage whereby acceleration can be detected in a wide range.

According to the second embodiment the synthesized signals $V'_{AB}$ in the cases where acceleration is applied along the directions of the x axis and y axis are S'×0.91 (mV), and the synthesized signal $V'_{AB}$ in the case where acceleration is applied along the direction of the z axis is S'×0.85 (mV). The difference is caused since the angle of inclination θ of the acceleration detecting elements (the bi-morph elements 1) in the acceleration sensors A' and B' with respect to the sensor attaching surface 3 is set at 25° in view of convenience in manufacturing. By calculation, it has been found that exactly the same detection sensitivities are provided along any of the directions of the x axis, y axis and z axis by setting the angle of inclination θ as 26.565 . . . °.

It has been confirmed by an investigation performed by the inventors of the present invention that when the angle of inclination from the sensor attaching surface 3 of the maximum sensitivity directions P of the bimorph elements 1 respectively integrated in the two acceleration sensors A' and B' arranged along the directions of orthogonal coordinate axes x and y on the sensor attaching surface 3, is changed between 0° to 90°, the sums ($|V'_A|+|V'_B|$) of the absolute values of the electric signals $V'_A$ and $V'_B$ outputted from the acceleration sensors A' and B' change as shown in Table 1.

TABLE 1

| Angle of Inclination | Detection sensitivity in x axis direction | | | Detection sensitivity in y axis direction | | | Detection sensitivity in z axis direction | | |
|---|---|---|---|---|---|---|---|---|---|
| θ (°C.) | A' | B' | $|V_A|+|V_B|$ | A' | B' | $|V_A|+|V_B|$ | A' | B' | $|V_A|+|V_B|$ |
| 0  | 0.00 | 1.00 | 1.00 | 1.00 | 0.00 | 1.00 | 0.00 | 0.00 | 0.00 |
| 5  | 0.00 | 1.00 | 1.00 | 1.00 | 0.00 | 1.00 | 0.09 | 0.09 | 0.17 |
| 10 | 0.00 | 0.98 | 0.98 | 0.98 | 0.00 | 0.98 | 0.17 | 0.17 | 0.35 |
| 15 | 0.00 | 0.97 | 0.97 | 0.97 | 0.00 | 0.97 | 0.26 | 0.26 | 0.52 |
| 20 | 0.00 | 0.94 | 0.94 | 0.94 | 0.00 | 0.94 | 0.34 | 0.34 | 0.68 |
| 25 | 0.00 | 0.91 | 0.91 | 0.91 | 0.00 | 0.91 | 0.42 | 0.42 | 0.84 |
| 30 | 0.00 | 0.87 | 0.87 | 0.87 | 0.00 | 0.87 | 0.50 | 0.50 | 1.00 |
| 35 | 0.00 | 0.82 | 0.82 | 0.82 | 0.00 | 0.82 | 0.57 | 0.57 | 1.14 |
| 40 | 0.00 | 0.77 | 0.77 | 0.77 | 0.00 | 0.77 | 0.64 | 0.64 | 1.28 |
| 45 | 0.00 | 0.71 | 0.71 | 0.71 | 0.00 | 0.71 | 0.71 | 0.71 | 1.41 |
| 50 | 0.00 | 0.64 | 0.64 | 0.64 | 0.00 | 0.64 | 0.76 | 0.76 | 1.53 |
| 55 | 0.00 | 0.58 | 0.58 | 0.58 | 0.00 | 0.58 | 0.82 | 0.82 | 1.63 |
| 60 | 0.00 | 0.50 | 0.50 | 0.50 | 0.00 | 0.50 | 0.86 | 0.86 | 1.73 |
| 65 | 0.00 | 0.43 | 0.43 | 0.43 | 0.00 | 0.43 | 0.90 | 0.90 | 1.81 |
| 70 | 0.00 | 0.35 | 0.35 | 0.35 | 0.00 | 0.35 | 0.94 | 0.94 | 1.88 |
| 75 | 0.00 | 0.26 | 0.26 | 0.26 | 0.00 | 0.26 | 0.96 | 0.96 | 1.93 |
| 80 | 0.00 | 0.18 | 0.18 | 0.18 | 0.00 | 0.18 | 0.98 | 0.98 | 1.97 |
| 85 | 0.00 | 0.09 | 0.09 | 0.09 | 0.00 | 0.09 | 1.00 | 1.00 | 1.99 |
| 90 | 0.00 | 0.01 | 0.01 | 0.01 | 0.00 | 0.01 | 1.00 | 1.00 | 2.00 |

As seen in Table 1, the detection sensitivities in the directions of the three mutually orthogonal axes are substantially the same only in case where the maximum sensitivity directions P of the respective acceleration sensors A' and B' are inclined from the sensor attaching surface 3 in a range of from 20° to 30°, by calculating the sums of the absolute values of the electric signals V'$_A$ and V'$_B$ outputted from the acceleration sensors A' and B'.

Embodiment 3

An explanation will be given of a third embodiment of the present invention. The third embodiment discloses the structure and the manufacturing method of an acceleration detecting element applicable to the first and second embodiments.

Figure 7:
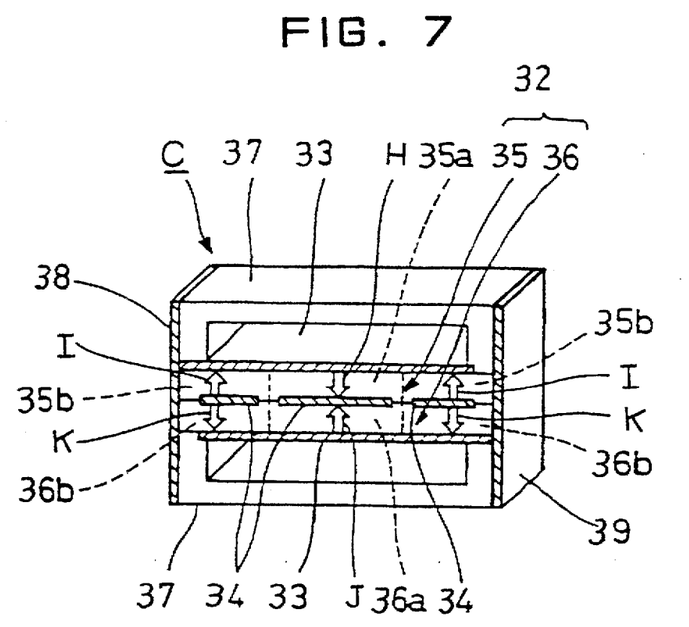
FIG. 7 is a partially broken-away perspective view showing an acceleration detecting element according to a third embodiment.
Figure 8A:
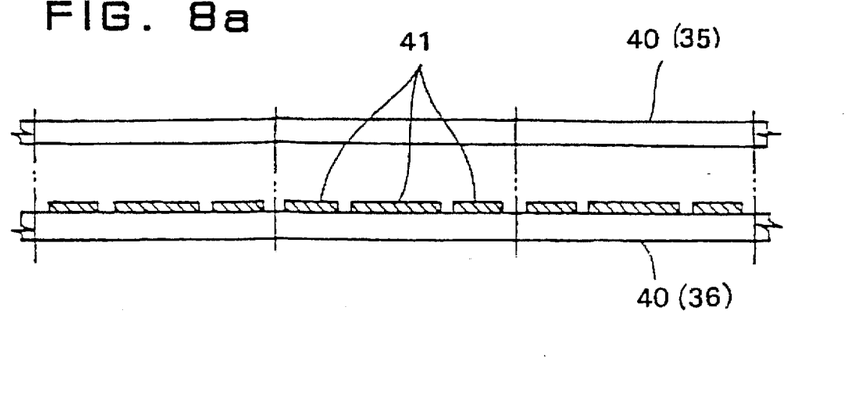
FIGS. 8(a), 8(b) and 8(c) illustrate sectional views showing steps of a prestage of a manufacturing method in the third embodiment.
Figure 8B:
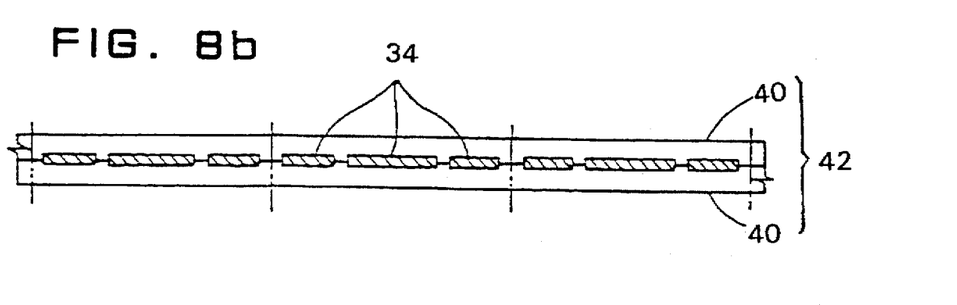
Figure 8C:
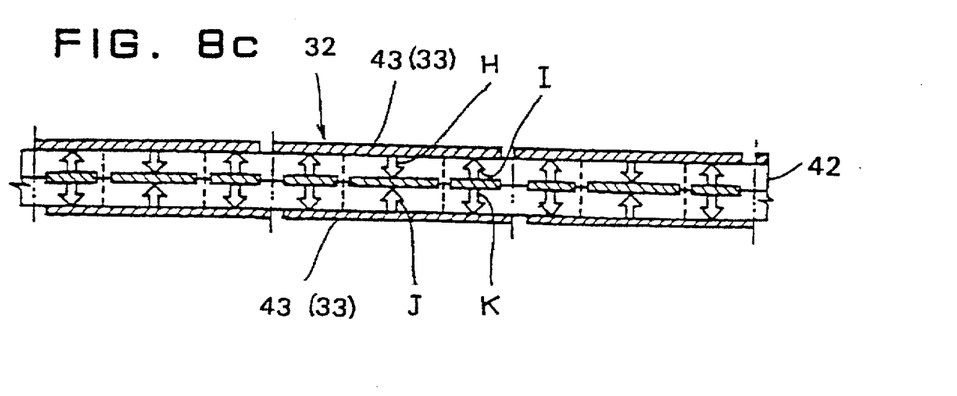
Figure 9A:
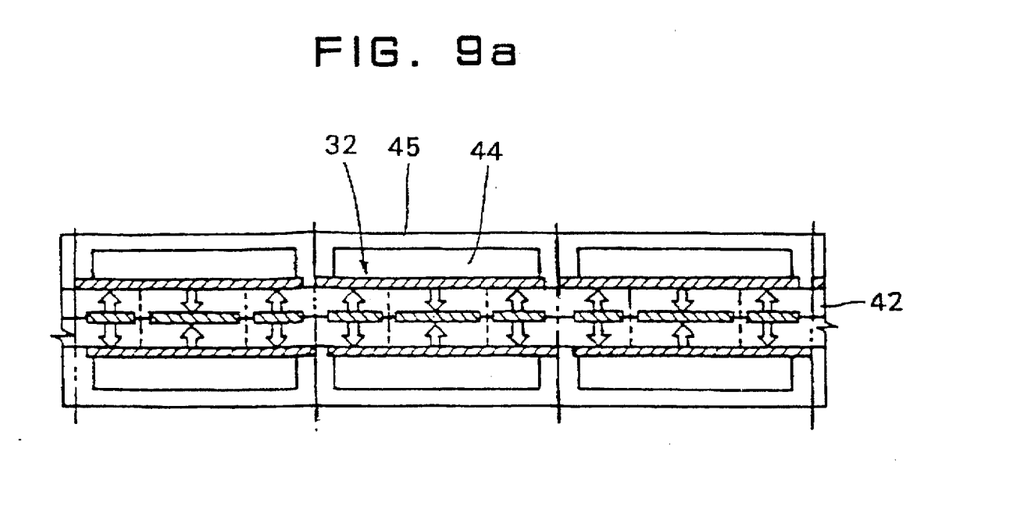
FIGS. 9(a) and 9(b) illustrate sectional views showing steps of a poststage of the manufacturing method in the third embodiment.
Figure 9B:
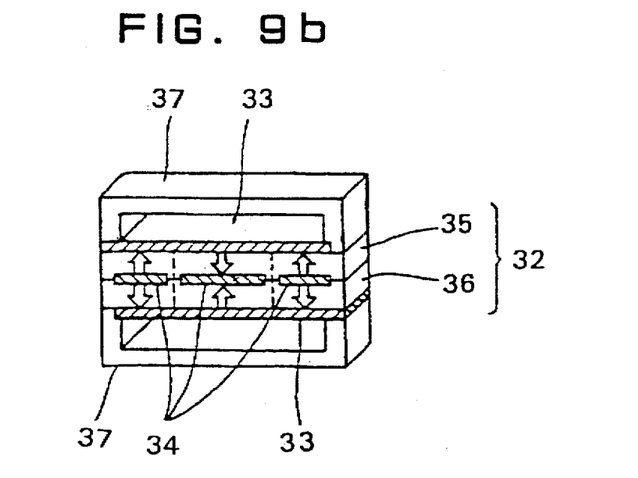
Figure 10A:
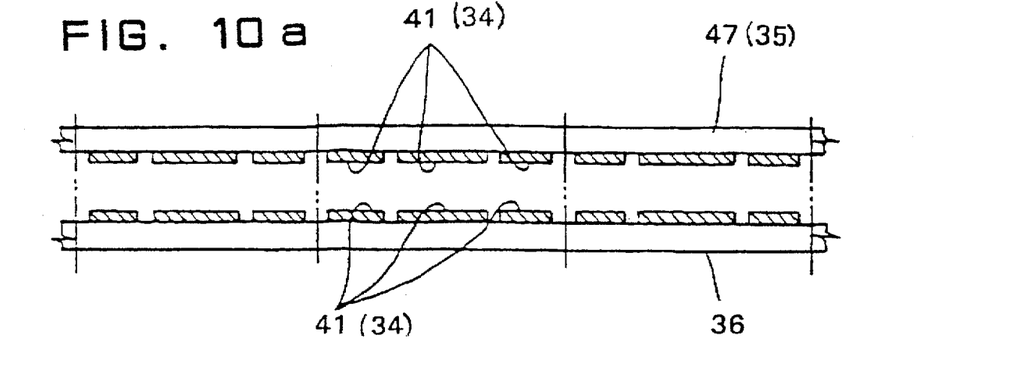
FIGS. 10(a), 10(b) and 10(c) illustrate sectional views showing a modified example of steps of the prestage in the manufacturing method of the third embodiment.
Figure 10B:
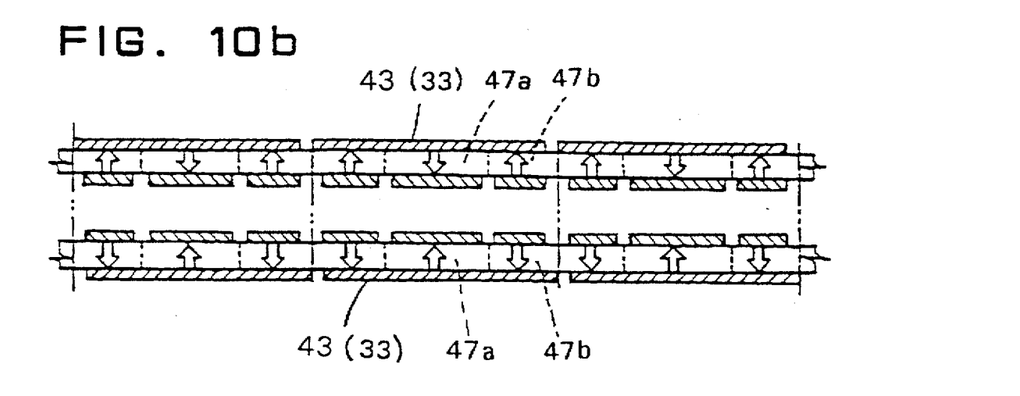
Figure 10C:
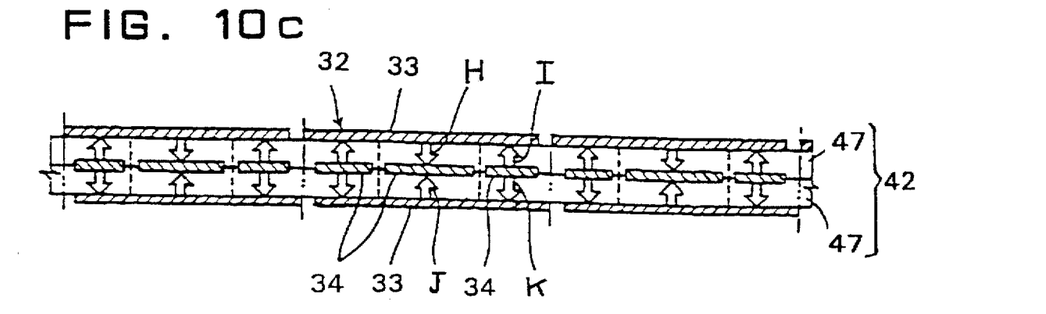

FIG. 7 is a partially broken away perspective view showing an acceleration sensor with its case lids removed, including an acceleration detecting element according to the third embodiment, FIGS. 8(a) through 8(c) illustrate sectional diagrams showing steps of a preliminary stage in the manufacturing method of the acceleration detecting element, FIGS. 9(a) and 9(b) illustrate sectional views showing steps of a finishing stage in the manufacturing method thereof and FIGS. 10(a) to 10(c) illustrate sectional views showing steps of a modified example of the preliminary stage in the manufacturing method thereof.

An acceleration detecting element C including an acceleration detecting element is composed of the bimorph structure capable of realizing the same function as in the conventional example. As shown in FIG. 7 the sensor includes piezoelectric ceramics bodies 32 in a rectangular plate shape having a predetermined thickness, for example, piezoelectric ceramics bodies 32 manufactured by a method of baking green sheets made of a piezoelectric ceramics. A signal output electrode 33 is formed as a single layer structure on a main surface of each of the piezoelectric ceramics bodies 32. The signal output electrode 33 on one side (the top side in FIG. 7) is extended up to one outer end and face (the left side in FIG. 7) of the piezoelectric ceramics body 32. Meanwhile, the signal output electrode 33 on the other side (the bottom side in FIG. 7) is extended up to the other outer end face (the right side in FIG. 7) of the piezoelectric ceramics body 32.

At an inner portion of the piezoelectric ceramics bodies 32 three inner electrodes 34 arranged separately at a center location and end locations along the longitudinal direction are embedded in parallel with the signal output electrodes 33. The ceramics regions 35 and 36 constituting the piezoelectric ceramics bodies 32 oppose each other on opposite sides of these inner electrodes 34, are respectively divided into three portions separated along the longitudinal direction of the piezoelectric ceramics bodies 32 corresponding to the inner electrodes 34, that is, center portions 35a and 36a and end portions 35b and 36b. Further, the respective center portion 35a and end portions 35b in the ceramics region 35 are polarized in the thickness direction with mutually different senses than the corresponding portions 36a and 36b in the region 36, as in the conventional example.

The acceleration detecting element is constituted by the piezoelectric ceramics bodies 32, the signal output electrodes 33 and the inner electrodes 34.

The polarization of the ceramics regions 35 and 36 is performed by using the signal output electrodes 33 and the inner electrodes 34. Here, the center portion 35a and the end portions 35b constituting the ceramics region 35 are provided with senses H and I of polarization. The center portion 36a and the end portions 36b constituting the ceramics region 36 are provided with senses J and K of polarization. Further, both ends along the longitudinal direction of the acceleration sensor C are fixedly supported by a pair of clamp frames 37 having a channel-like shape when seen in a side view. The respective signal output electrodes 33 formed on the main surfaces of the piezoelectric ceramics bodies 32 are connected to respective external output electrodes 38 and 39 formed on mutually different outer end faces of the piezoelectric ceramics bodies 32 and the clamp frames 37.

Next, an explanation will be given of the manufacturing procedure of the acceleration sensor C including the acceleration detecting element shown in FIG. 7 in reference to sectional views of steps illustrated in FIGS. 8(a) to 8(c) and FIGS. 9(a) and 9(b). Further, in these views respective sizes and shapes corresponding to each individual acceleration detecting element and the acceleration sensor C are partitioned by imaginary lines.

Firstly, as shown in FIG. 8(a) green sheets in a rectangular plate shape having a size and a shape corresponding to a number of the piezoelectric ceramics bodies 32 constituting the acceleration detecting elements, that is, two green sheets made of a piezoelectric ceramics and to be finally transformed into the ceramics regions 35 and 36, are prepared. Further, a conductive paste of silver, silver-palladium or the like is applied by a method of screen printing or the like on one face of one (the bottom one in FIG. 8(a)) of the green sheets 40, that is, applied at every center location and every end location on the one face corresponding to every piezoelectric ceramics body 32 along the longitudinal direction. The conductive paste is dried under a temperature of approximately 100° C. thereby forming inner electrode patterns 41 arranged separated from each other.

As shown in FIG. 8(b) a face of the green sheet on the other side, that is, the green sheet 40 on which the inner electrode patterns 41 are not formed, is laminated on the face of the green sheet 40 on which the respective inner electrode patterns 41 have been formed and the assembly is baked under a temperature of approximately 1000° C. Then, the two green sheets 40 in the laminated state are bonded together by baking whereby an integrated piezoelectric ceramics basic body 42 is made. Further, the inner electrode patterns 41 interposed between the two green sheets 40 are simultaneously baked along with the baking treatment and the respective inner electrodes 34 arranged separately from each other are formed.

Next, as shown in FIG. 8(c) the conductive paste is respectively applied on the main surfaces of the piezoelectric ceramics basic body 42, signal output electrode patterns 43 are formed by drying the pasted basic body under a temperature of approximately 100° C. and the assembly is baked under a temperature of approximately 800° C. by which the respective signal output electrodes 33 are formed. Thereafter, the center portions 35a and 36a and the end portions 35b and 36b of the ceramics regions 35 and 36 constituting the piezoelectric ceramics bodies 32 are polarized by applying direct current electric fields across the signal output electrodes 33 and the inner electrodes 34. Further, the respective portions 35a, 36a, 35b and 36b are polarized to produce the senses of polarization H through K shown in FIG. 7.

Thereafter, as shown in FIG. 9(a), clamp frame basic bodies 45 in which recessed grooves 44 each having a predetermined width dimension are formed at predetermined locations on the inner surface side, are prepared and integrated by pasting the respective clamp frame basic bodies 45 on the main surfaces of the piezoelectric ceramics basic body 42 on which the signal output electrodes 33 have been formed. Then, the piezoelectric ceramics basic body 42 and the clamp frame basic bodies 45 are cut at the respective imaginary lines which are set by partitioning the sizes and shapes corresponding to each piezoelectric ceramics body 32. Then, the acceleration sensor has the appearance shown in FIG. 9(b), that is, the acceleration sensor constituted by a pair of the clamp frames 37 and the acceleration detecting element, which is constituted by the piezoelectric ceramics bodies 32, the signal output electrodes 33 and the inner electrodes 34.

Then, the external output electrodes 38 and 39 are formed on respective outer end faces of the acceleration detecting element, that is, on the outer end faces of the piezoelectric ceramics bodies 32 and the clamp frames 37, by which the acceleration sensor C of the bimorph structure as shown in FIG. 7 is finished. Further, the respective signal output electrodes 33 are conductively connected to the respective external output electrodes 38 and 39 in a T-like form.

The manufacturing method of the acceleration sensor C according to the third embodiment is not limited to the procedure shown in FIGS. 8(a) through 8(c) and it is possible to adopt a procedure as shown in FIGS. 10(a) through 10(c). FIGS. 10(a) through 10(c) show a modified example of the preliminary stage in manufacturing the acceleration detecting element and parts and portions common to those in FIGS. 8(a) through 8(c) are labelled with the same notations in FIGS. 10(a) through 10(c).

As shown in FIG. 10(a) in this modified example, firstly, piezoelectric ceramics plates in a rectangular plate shape which have previously been baked, that is, two piezoelectric ceramics plates 47 having a size and a shape corresponding to the piezoelectric ceramics bodies 32 constituting the acceleration sensors, are prepared. The conductive paste is applied and dried on faces of both of the respective piezoelectric ceramics plates 47, that is, at the center locations and the end locations along the longitudinal direction of the faces, each corresponding to a single piezoelectric ceramics body 32, whereby the respective inner electrode patterns 41 arranged separately from each other are formed.

Thereafter, as shown in FIG. 10(b) the conductive paste is applied on the other faces of the respective piezoelectric ceramics plates 47 by which the signal output electrode patterns 43 are formed and the inner electrode patterns 41 and the signal output electrode patterns 43 are simultaneously baked by which the respective signal output electrodes 33 and the respective inner electrodes 34 are formed. Center portions 47a and end portions 47b disposed along the longitudinal direction of the respective piezoelectric ceramics plates 47 are polarized by applying direct current fields across the respective signal output electrodes 33 and the inner electrode 34 in the respective piezoelectric ceramics plates 47. The respective piezoelectric ceramics plates 47 finally become the ceramics regions 35 and 36 and in this operation the center portions 35a and 36a and the end portions 35b and 36b in the ceramics regions 35 and 36 are polarized.

Then, as shown in FIG. 10(c) the faces of the piezoelectric ceramics plates 47 on which the respective inner electrodes 34 have been formed are adhered by using a thermosetting adhesive agent (not shown) and the assembly is heated by which the piezoelectric ceramics plates 47 are integrated into the piezoelectric ceramics basic body 42. The piezoelectric ceramics basic body 42 which has been made in accordance with the above-mentioned procedure is provided with the same structure as that shown in FIG. 8(c).

Thereafter, the integrated piezoelectric ceramics basic body 42 is subjected to the procedure in the finishing stage of the manufacturing method as shown in FIGS. 9(a) and 9(b) by which the acceleration sensor C having the bimorph structure as shown in FIG. 7 is finished.

According to the acceleration detecting element and the manufacturing method of the third embodiment, the polarization treatment is performed after separating the inner electrodes. Accordingly, it is not necessary to perform the polarization treatment after previously forming separated surface electrodes and it is also not necessary to constitute signal output electrodes by forming connecting electrodes after the polarization treatment.

Further, it is naturally possible to form the acceleration sensor C in the third embodiment such that the acceleration detecting element constituted by the piezoelectric ceramics bodies 32, the signal output electrodes 33 and the inner electrodes 34, is inclined from the sensor attaching surface as in the acceleration sensors used in the first and the second embodiments.

As explained above, according to the mounting arrangement of acceleration detecting elements in the present invention, it is possible to detect acceleration operating along any one of three mutually orthogonal directions with substantially the same detection sensitivity by using two acceleration detecting elements and acceleration can be detected over a wide range. As a result the present invention provides an effect whereby not only the mounting arrangement is simplified but the cost is reduced.

Further, according to the acceleration detecting element and the manufacturing method in this invention, separately arranged inner electrodes are arranged at an inner portion of piezoelectric ceramics bodies and respective portions in ceramics regions are polarized by using the inner electrodes. Therefore, it is not necessary to perform polarization treatment after previously forming separated surface electrodes on main surfaces of the piezoelectric ceramics bodies and it is also not necessary to constitute signal output electrodes of a two layer structure by forming connecting electrodes after the polarization treatment. As a result the present invention provides an effect whereby various inconveniences in constituting the signal output electrodes of a two layer structure are not caused and time and labor in manufacturing the acceleration detecting elements can be saved.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A mounting arrangement of acceleration detecting elements with respect to mutually orthogonal x, y and z axes, comprising two acceleration detecting elements, and a detection circuit including a logical OR circuit which outputs a logical ONE if there is an electrical signal from the first one of the acceleration detecting elements, an electrical signal from the second one of the acceleration detecting elements or an electrical signal from both of the acceleration detecting elements, wherein a first one of the acceleration detecting elements has a maximum sensitivity direction which is inclined from the y axis toward the z axis by 40° to 50° and a second one of the acceleration detecting elements has a maximum sensitivity direction which is inclined from the x axis toward the z axis by 40° to 50°, thereby providing substantially constant acceleration detection sensitivity along all three of said axes.

2. A mounting arrangement of acceleration detecting elements with respect to mutually orthogonal x, y and z axes, comprising:

two acceleration detecting elements;

a calculating circuit for calculating a sum of absolute values of electric signals outputted from the respective acceleration detecting elements; and wherein a first one of the acceleration detecting elements has a maximum sensitivity direction which is inclined from the y axis toward the z axis by 20° to 30° and a second one of the acceleration detecting elements has a maximum sensitivity direction which is inclined from the x axis toward the z axis by 20° to 30°, thereby providing substantially constant acceleration detection sensitivity along all three of said axes.

3. The mounting arrangement of acceleration detecting elements according to claim 1 or claim 2, wherein each of the acceleration detecting elements comprises a piezoelectric ceramics bimorph element fixed at both ends thereof.

4. The mounting arrangement of acceleration detecting elements according to claim 3, wherein said element comprises a pair of piezoelectric ceramic bodies having a rectangular plate shape; inner electrodes are provided at an inner portion between the piezoelectric ceramics bodies and arranged separately from each other at a center location and end locations along a longitudinal direction of the piezoelectric ceramics bodies; signal output electrodes are provided on outer main surfaces of the piezoelectric ceramics bodies; and respective center portions and end portions along the longitudinal direction of the piezoelectric ceramics bodies opposed to each other via the inner electrodes are polarized in a thickness direction with opposite senses.

5. An acceleration sensor, comprising:

two acceleration detecting elements being mounted with respect to mutually orthogonal x, y, z axes, and a detection circuit including a logical OR circuit which outputs a logical ONE if there is an electrical signal from the first one of the acceleration detecting elements, an electrical signal from the second one of the acceleration detecting elements or an electrical signal from both of the acceleration detecting elements, wherein a first one of the acceleration elements has a maximum sensitivity direction which is inclined from the y axis toward the z axis by 40° to 50° and a second one of the acceleration detecting elements has a maximum sensitivity direction which is inclined from the X axis toward the z axis by 40° to 50°, thereby providing substantially constant acceleration detection sensitivity along all three of said axes.

6. An acceleration sensor, comprising:

two acceleration detecting elements being mounted with respect to mutually orthogonal x, y, z axes; and a calculating circuit for calculating a sum of absolute values of electric signals outputted from the respective acceleration detecting elements;

wherein a first one of the acceleration elements has a maximum sensitivity direction which is inclined from the y axis toward the z axis by 20° to 30° and a second one of the acceleration detecting elements has a maximum sensitivity direction which is inclined from the X axis toward the z axis by 20° to 30°, thereby providing substantially constant acceleration detection sensitivity along all three of said axes.

7. An acceleration sensor according to claim 5, wherein the detection circuit includes a first comparator for comparing the electrical signal from the first one of the acceleration detecting elements to a predetermined value and outputting a logical ONE if the electrical signal from the first acceleration detecting element is greater than the predetermined value and outputting a logical ZERO if the electrical signal from the first one of the acceleration detecting elements is equal to or lower than said predetermined value, and a second comparator for comparing the electrical signal from the second one of the acceleration detecting elements to the predetermined value and outputting a logical ONE if the electrical signal from the second acceleration detecting element is greater than the predetermined value and outputting a logical ZERO if the electrical signal from the second one of the acceleration detecting elements is equal to or less than the predetermined value.

* * * * *